July 7, 1936.  T. B. FUNK ET AL  2,046,619
APPARATUS FOR FORMING LAWN MOWER BLADE BLANKS
Filed March 17, 1934   3 Sheets-Sheet 1

Inventor
Truman B. Funk
Howard D. Corwin
By Beaman & Langford
Attorney

July 7, 1936.  T. B. FUNK ET AL  2,046,619
APPARATUS FOR FORMING LAWN MOWER BLADE BLANKS
Filed March 17, 1934  3 Sheets-Sheet 2

Inventor
Truman B. Funk
Haward D. Corwin
By Beaman & Langford
Attorney

July 7, 1936.   T. B. FUNK ET AL   2,046,619
APPARATUS FOR FORMING LAWN MOWER BLADE BLANKS
Filed March 17, 1934    3 Sheets-Sheet 3

Inventor
Truman B. Funk
Howard D. Corwin
By Beaman & Langford
Attorney

Patented July 7, 1936

2,046,619

UNITED STATES PATENT OFFICE 2,046,619

APPARATUS FOR FORMING LAWN MOWER BLADE BLANKS

Truman B. Funk and Howard D. Corwin, Jackson, Mich., assignors to "Yard-Man", Inc., Jackson, Mich., a corporation of Michigan Application March 17, 1934, Serial No. 716,166

17 Claims. (Cl. 153—78)

This invention relates to bending and twisting bars of straight material and particularly to a machine for the production of lawn mower cutting-reel blade blanks.

Heretofore the fabrication of cutting-reel blades has usually been effected by forming the same either in hot or cold condition with rollers. When the blades have been formed while in a hot condition the unevenness of the heat consequent upon the time required in handling such blade, resulted in a great lack of uniformity both in the bend and in the twist. Another disadvantage in the prior practice has been that due to the fact that the blades have been heat treated after providing them with their formed contour it has been impossible to obtain a large number of blades of uniform configuration without a large number of rejections resulting in excessive waste and consequent increase in expense.

This invention particularly relates to an improvement to the patent to Braun No. 194,409 which has, among other defects, those enumerated above, and which is not in use today for the reason that it is impossible to obtain satisfactory results. An object of this invention is, therefore, to overcome the above noted disadvantages by providing a machine wherein the bending and twisting operations effect a uniform result irrespective of heating and tempering considerations.

Another object is to provide a machine which forms lawn mower cutting-reel blades while hot.

A further object is to provide a machine having a plurality of disks concentrically disposed on a single shaft and each having a slot in alignment with like slots on the other disks to receive a heated unformed blade to bend and twist the same.

Figure 1:
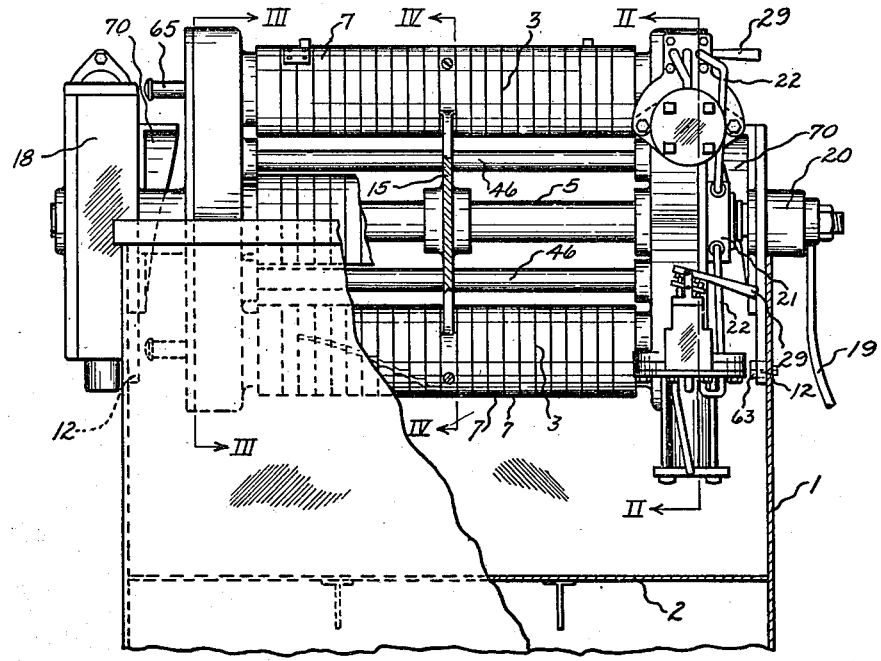
Figure 2:
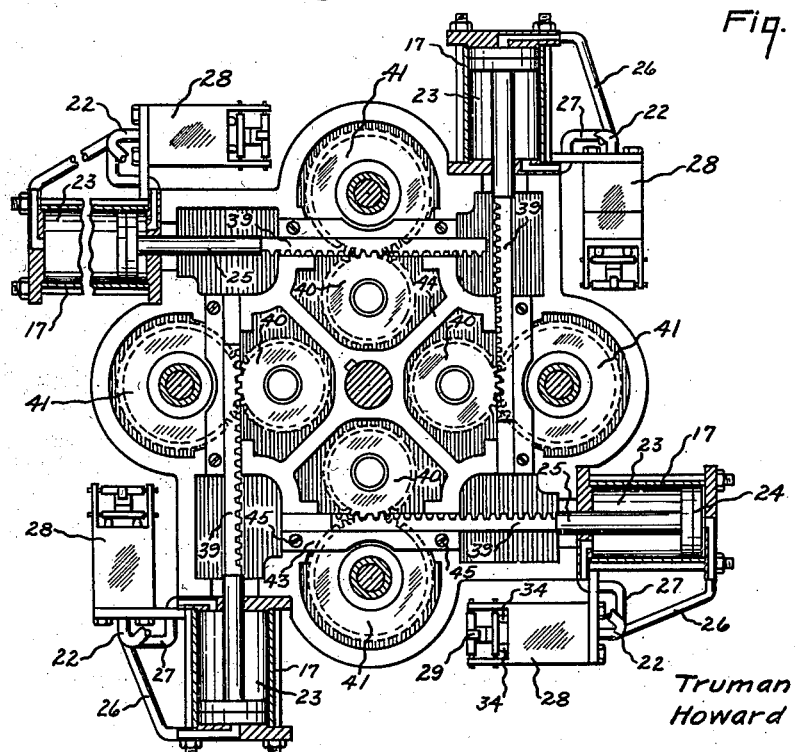
Figure 3:
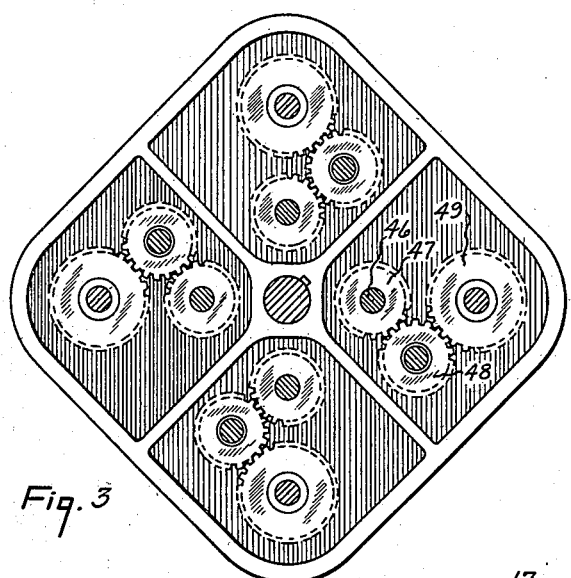
Figure 11:
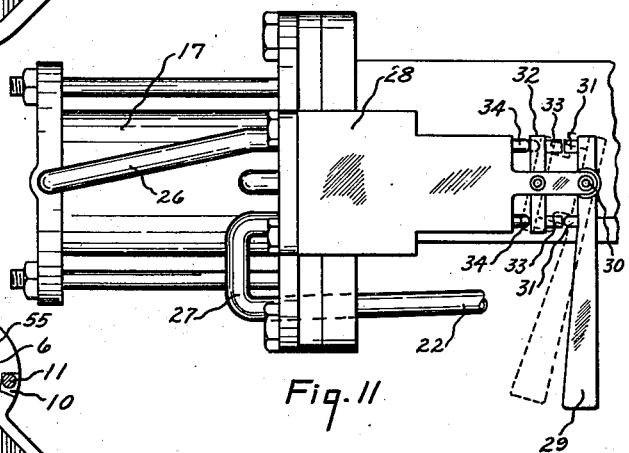
Figure 4:
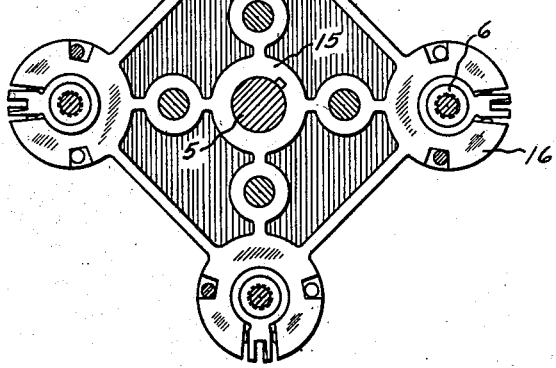
Figure 5:
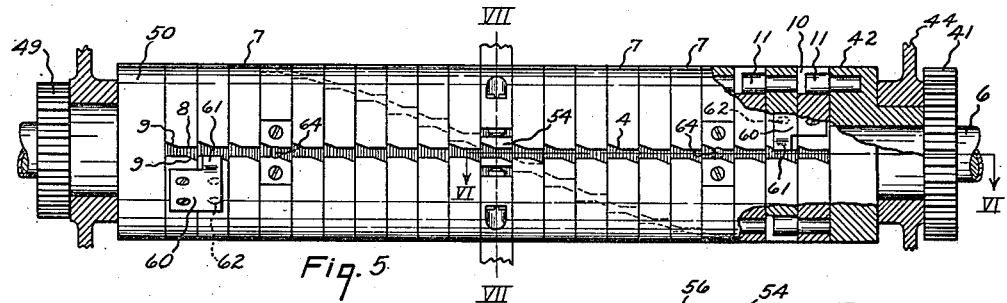
Figure 8:
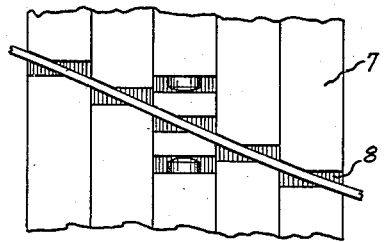
Figure 7:
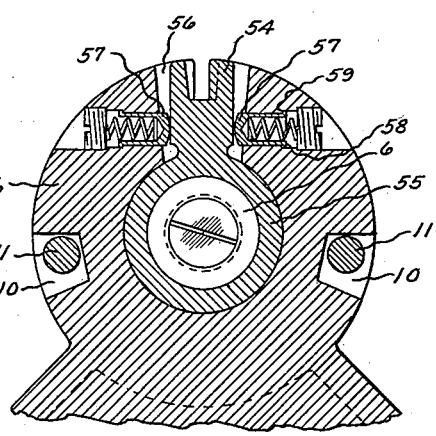
Figure 6:
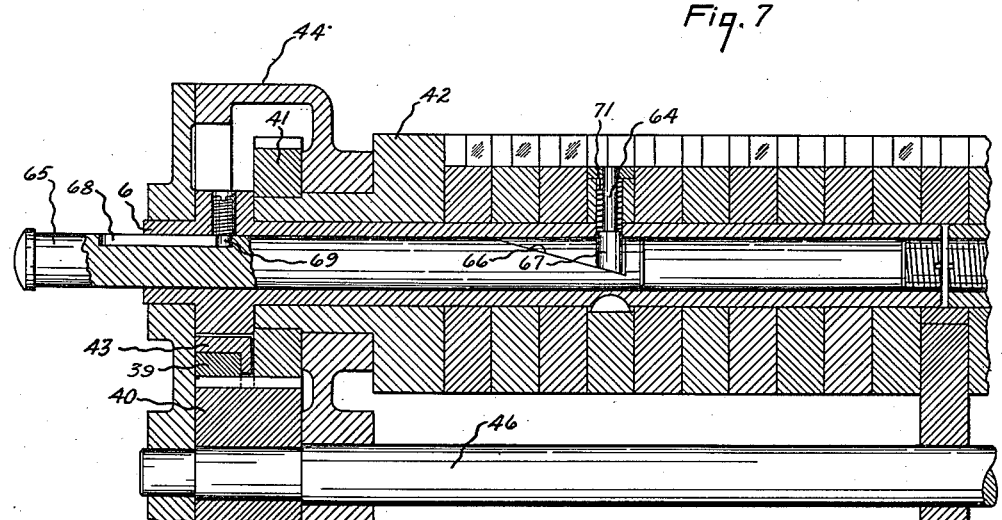
Figure 9:
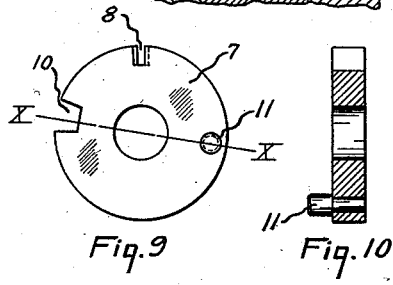
Figure 10:

These and other objects will be apparent from the foregoing specification when taken with the accompanying drawings in which Fig. 1 is an end elevation with parts broken away showing the complete assembled machine, Fig. 2 is a sectional side elevation taken on the line II—II of Fig. 1, Fig. 3 is a sectional elevation taken on the line III—III of Fig. 1, Fig. 4 is a sectional end elevation taken on the line IV—IV of Fig. 1, Fig. 5 is a detailed section of one of the forming and clamping cylinders, Fig. 6 is a detailed section taken on the line VI—VI of Fig. 5, Fig. 7 is a detailed section taken on the line VII—VII of Fig. 5, Fig. 8 is a detailed section of a central portion of the forming and clamping cylinder shown in Fig. 5 showing a twisted blade in place in the twisting and clamping slots, Fig. 9 is a side elevation of a single disk from Fig. 5, Fig. 10 is a section on the line X—X of Fig. 9, and Fig. 11 is a detailed elevation of one of the compressed air operating motors for the forming and clamping cylinders.

Referring to Fig. 1 of the drawings, 1 indicates a tank over which the twisting machine is mounted. The tank 1 has a bottom 2 and in normal operation is filled with oil or some other quenching fluid to a level sufficient to cover, simultaneously, two forming and clamping cylinders 3 when rotated into the tank. Briefly the operation of the machine comprises placing a lawn mower blade blank, or other bar to be formed, in the channel 4 of one of the upper forming and clamping cylinders 3, as shown more particularly in Figs. 5 and 8. The straight unformed blade or bar is placed therein while hot and is formed by the rotating in opposite directions the ends of the cylinder 3. Then, while still in the channel 4, it is rotated about the shaft 5 to carry it into the tank 1 for quenching and tempering.

The machine comprises four forming and clamping cylinders 3, mounted for rotation with the shaft 5. The forming and clamping cylinders 3 are built up from a plurality of disks 7 concentrically and loosely supported upon the shafts 6. Each of the disks 7 is provided with a radial slot 8 in the periphery thereof having the opposite edges milled to true segments of a helix as at 9, the slots being defined by opposed spaced shoulder portions. In normal or initial position of the forming and clamping cylinder 3 the slots 8 are in alignment and together form the channel 4. The disks 7 are also provided with unchamfered radial slots 10 in their peripheries and pins 11. Each disk 7 is adapted to partially rotate. The slots 10 and the pins 11 are so related in position that the pins 11 loosely fit in the adjacent slots 10 whereby rotary movement of one disk will drive a disk adjacent thereto when moved in a direction returning them to initial position, to bring the slots 8 into alignment.

The shaft 5 is journaled in supporting plates 12 secured to opposite sides of the tank 1. Mounted centrally of the machine is a supporting frame 15. The supporting frame 15 carries the shaft 5, the shafts 6 and has four disks 16 concentrically disposed about the shafts 6 and of the same size and form as the disks 7 and in alignment therewith. The disks 16 are provided with two radially disposed slots 10 for receiving pins 11 of adjacent disks 7.

Rotary movement is given to the whole machine including the forming and clamping cylinders 3 and the compressed air operated motors 17, by any known form of indexing head 18 for imparting periodical rotation to the machine successively moving the forming and clamping cylinders 3 into the tank 1 and returning them to initial position at the top of the machine. Each of the forming and clamping cylinders 3 is operated from a separate power source comprising the compressed air motors 17 supplied with compressed air from any suitable source by the conduit 19. The shaft 5, at the right side thereof, is equipped with a hollow head 20 and a distributing head 21. Compressed air is conducted from the distributing head 21 to the compressed air motors 17 by the conduits 22. Each compressed air motor 17 includes a cylinder 23, piston 24, a piston rod 25 and conduits 26 and 27, the latter alternately supplying and exhausting compressed air to the cylinder 23 to drive the piston 24. Each motor 17 is also provided with a control box 28 not a part of this invention, having a handle 29 pivoted at 30 and having thereon locking lugs 31. Pivoted adjacent to the handle 29, is a locking bar 32 which has thereon locking lugs 33 for engagement with the locking lugs 31. Extending into the control box 28 are valve pins 34. The operation of the control box 28 is such that downward movement of the handle 29 causes the same to swing about its pivot 30 carrying with it the locking lugs 31. The locking bar 32 then is swung about its pivotal point, to depress two of the valve pins 34, to distribute the compressed air entering through the conduit 22, to drive the piston 24 in forming and clamping direction. The locking lugs 31 and 33 are so related to each other in respect to position that they slip behind each other respectively and lock the control box in position for continued operative action of the forming and clamping cylinders with which the particular motor 17 is associated.

Connected to each piston rod 25 is a rack 39. Referring particularly to Fig. 2 the racks 39 are shown in operative position engaging the pinions 40. As shown in Fig. 6 the pinions 40 are substantially wider than the rack 39 which engages with one side only thereof. Gears 41 fixed to the cylinder heads 42 engage with the other half of the pinions 40. As shown in the drawings the rack 39 is maintained in operative engagement with the pinions 40 by the casings 43. The casings 43 are secured to the end frame 44 by the screws 45. The pinions 40 are concentrically mounted on and secured to shafts 46. The shafts 46 extend from one side of the machine to the other being supported at the central portions thereof by the frame 15. At the opposite side from the pinions 40, the shafts 46 each have secured thereto a pinion 47. The pinions 47 engage with idler pinions 48 which in turn engage with the gears 49, each one of which is secured to a forming and clamping cylinder head 50 of a cylinder 3. Axial movement of the rack 39 results in the rotation of its pinion 40 to drive its corresponding forming and clamping cylinder head 42 in one direction and, through the shaft 46 as associated gearing on the other side of the machine, the forming and clamping cylinder head 50 in the opposite direction. As shown in Fig. 5 the shaping and forming cylinder heads 42 and 50 each are provided with a pin 11 for engagement with the cooperating slot 10 in the adjacent disks. When a blade to be formed is placed in the channel 4 as shown in Fig. 5 and its rack 39 is operatively moved in axial direction to move the heads 42 and 50 in opposite directions, the disks adjacent thereto are driven to force the blade blank into engagement with each successive disk whereby the disks are driven until the blade is clamped between each adjacent disk as shown in Fig. 8. Further rotary movement of each disk 7 is then prevented. The blade is now fully formed.

In order to compensate for inaccuracies in manufacturing and loss of motion in transmitting power from one end of a cylinder 3 to the other end thereof, each centrally fixed disk 16 is equipped with movable jaws 54. These jaws are supported by a ring bracket 55 concentrically and oscillatably mounted on the shaft 6. Referring particularly to Fig. 7 the oscillatable jaws 54 are resiliently supported in central position in a radial slot 56 by spring pressed plungers 57. These plungers 57 are each provided with shoulders 58 adapted to abut against ledges 59 to limit their movement into the slot 56 so that the jaws 54 will always return to central position. It will, thus, be evident that should either the head 50 or 42 receive more movement in their respective directions than the other, the jaws 54 will float to preserve the continuity of the curve formed in the blade.

In order to adapt the shaping and forming cylinders 3 to blades of various sizes, the adjustable locking blocks 60 are provided, each having a shoulder 61 adapted to overhang the channel 4 when the cylinder 3 is in forming position, the shoulder preventing the blade being formed, from premature delivery from the channel 4. The principal function of the shoulder 61 is to hold the blade in the channel at the beginning of the forming operation. Tapped holes 62 are provided in several disks 7 so that the blocks 60 may be secured to any selected disk 7.

The forming and clamping cylinders 3 are provided with ejectors 64, one on each end, for delivering the blades from the channels 4. The ejectors 64 each are operated by an axially movable rod 65 having therein a camming notch 66 engaging with an enlarged extension 67 of the ejector 64. Each rod 65 is provided with a slot 68 into which extends a pin 69 to prevent rotary movement thereof and to limit the endwise movement of rod 65. Secured at each side of the tank 1 to supporting plates 12 are ejector cams 70. As the forming and clamping cylinder 3 passes from its submerged position and carries with it rod 65 it moves the same into engagement with the cam 70. As a rod 65 passes a cam 70 it is moved axially of the cylinder 3 to cam the ejector 64 into engagement with the blade reposing in the channel 4. Each ejector 64 is moved against the action of a spring 71 which is sufficiently strong to force the rod 65 back to its normal position when the same has moved from engagement with the cam 70.

In normal position of the machine two cylinders 3 are immersed in the quenching fluid and two are above it. The operation of the machine is as follows: A blade heated to a predetermined temperature is placed in the channel 4 of the forming and clamping cylinder 3, about to be immersed, the locking blocks 60 having been previously adjusted to the length of the blade to be formed. The rack 39, corresponding to the forming and clamping cylinder 3, having in its channel 4 an unformed heated blade, is moved in an axial direction to rotatively move the heads 42 and 50 in opposite directions. The heads 42 and 50, through pins 11, each rotatively move the disk 7 adjacent to it. In the case of a blade having a length equal to the channel 4, the blade, moved at each end by the end disks 7 successively drives the disks 7 until it is clamped in the channel 4 as shown in Fig. 8. Due to the fact that the disks 7 are loosely mounted they rotate freely under the pressure exerted by the blade until further movement is prevented by the clamping action of the adjacent disks. As shown in Fig. 8, the milled portions 9 engage along their full length with the blade and it is the bite exerted by adjacent milled portions 9 that clamps the blade at the end of the forming operation. By varying the length of the milled portions 9, the length of the blade engaged by the disks 7, during the clamping action, may be varied. As shown, substantially the entire length of the blade is clamped. The shoulders 61 of the blocks 60 operate as above described to prevent radial movement of the blade out of the channel 4 during the forming operation. The blade is now formed and ready for quenching. The rack 39 is moved in forming and clamping direction by lifting the handle 29 of the control box 28. This operation of the handle 29 depresses the valve pins 34 which permit the entrance of compressed air into the operating side of the cylinder 23 and open the other side of cylinder 23 to the atmosphere.

Should the blade to be formed have a length less than that of the forming and clamping cylinders 3 the blocks 60 are secured to the disks 7, and spaced apart a distance slightly less than the length of the blade to be formed so that the shoulders 61 will be in a position to overhang the ends of the blade during the forming and clamping operation.

The indexing head 18 is timed to rotate all of the cylinders 3 about the shaft 5 to carry the newly formed blade into the quenching bath, to cool the same, immediately on the completion of the forming operation. Before the blade is ejected by the operation of the ejectors 64 the blade must be unclamped from the disks 7. This unclamping is effected by the handle 29 engaging with the cam 63 to move the handle 29 to normal horizontal position resulting in opening both sides of the cylinder 23 to the atmosphere. The rod 65 then engages with the cam 70 to operate the ejectors 64, as above described, to eject the blade from the slot. It is to be understood that upon release of the pressure in the clamping cylinder sufficient retroactive rotation of the disks 7 and heads 42 and 50 result to remove the shoulder 61 from over the formed blade to permit ejection. As the empty cylinder 3 reaches its just prior to immersing position the handle 29 is manually raised to reverse the operation of the motor 17 and the rack 39 to move the heads 42 and 50 in a direction opposite to their initial rotation. The pins 11 and the slots 10 then function both as driving members and stops to rotate the disks 7 to align each of the peripheral slots 8 into the straight channel 4. The cylinder is now set for receiving a new heated blade and repeating the operation. It is to be, of course, understood that in the embodiment of the invention shown, the four forming and clamping cylinders 3 each successively receive a heated blade whereby the complete unit is continuously operated.

It is to be noted that during the quenching operation of this machine the oil reaches the outer or cutting edge of the blade before it reaches the inner edge thereof, resulting in a hard cutting edge and a tough inner edge, or core, thus automatically providing the blade with a dual temper resulting in maximum operative efficiency. It is further to be noted that this invention makes it possible, in automatic, successive operations to form and bend a blade and heat treat the same resulting in a finished product having the exact contour desired.

While the apparatus described discloses a single embodiment of the invention being for the forming of lawn mower blades, it is, nevertheless, contemplated that it apply to machines for forming other types of bars and that the invention include apparatus having only one or any number of forming and clamping cylinders. By cylinder, in the specification and claims, is meant any elongated cylinder like structure whether its section be circular or not. By disk is meant a flat plate having an outline corresponding to a section of the above described cylinder. These and other modifications are contemplated and we therefore, do not wish to be limited except by the scope of the following claims.

We claim:

1. A forming machine having in combination, a cylinder comprising a shaft having a plurality of concentrically disposed disks thereon, a radial slot located in the periphery of each disk, a head concentrically mounted on said shaft and disposed adjacent to one of said disks, means operatively connecting each of said disks and head for variable rotative movement, and means to drive said head to selectively move said slots into or out of straight alignment.

2. A forming machine having in combination, a shaft having a plurality of concentrically disposed disks thereon, a radial slot located in the periphery of each disk, said slots being normally in straight alignment and forming a channel, a driving head mounted concentrically on said shaft at each end of said cylinder, means operatively connecting each of said heads and said disks for variable rotative movement, and means to rotate said heads in opposite directions to vary the alignment of said slots.

3. A forming machine having in combination, a shaft having a plurality of concentrically disposed disks thereon, a radial slot located in the periphery of each disk, said slots being normally in straight alignment and forming a channel, a driving head concentrically disposed on each end of said shaft, means operatively connecting said heads and the disks next adjacent thereto, means for rotating said heads in opposite directions so that when a bar is placed in said channel it will be bent and twisted to give it a predetermined shape, means to reverse the rotation of said heads and means associated with said disks to move and to limit the return of the slots, therein, to normal straight alignment.

4. A forming machine having in combination, a shaft having a plurality of concentrically disposed disks thereon, a radial slot located in the periphery of each disk, said slots being normally in straight alignment and forming a channel, heads concentrically located on said shaft at each end of said cylinder and adjacent to said disks, means operatively connecting said heads with the next adjacent disks, means operative when a bar is placed in said elongated slot to rotate said heads to drive said disks through said heads, and stops in said disks, to align the slots upon opposite rotation, respectively, of said heads.

5. A forming machine having in combination, a shaft having a plurality of concentrically disposed disks thereon, a radial slot located in the periphery of each disk, said slots being normally in straight alignment and forming a channel in the surface of said cylinder, means operatively connecting said disks for variable movement in one direction with respect to each other, movement in the other direction being accomplished by the member being formed in said channel, and means at each end of said cylinder for driving the end disks in opposite directions.

6. A forming machine having in combination, a cylinder comprising a shaft having a plurality of concentrically disposed disks thereon adapted to partial rotation, a radial slot located in the periphery of each disk, said slots forming a channel, a fixed disk concentrically disposed on said shaft, means defining a floating, compensating slot mounted in said disk and in alignment with said channel, and means to displace said disks on one side of said fixed disk in one direction and on the other side of said fixed disk in the other direction.

7. A forming machine having in combination, a shaft having a plurality of concentrically disposed disks thereon, a radial slot located in the periphery of each disk, said disks being normally in straight alignment and forming a channel for receiving a bar to be formed, means to eject a bar placed therein after it has been formed, said means comprising a pin normally disposed beneath said channel and movable upon actuation into said channel, and means for operating said pin.

8. A forming machine having in combination, a shaft having a plurality of concentrically disposed disks thereon, a radial slot located in the periphery of each disk, said disks being normally in straight alignment and forming a channel for receiving a bar to be formed, means to deform said channel, means to eject a bar placed therein after it has been formed, said means comprising a pin normally disposed beneath said channel and movable upon actuation into said channel and means for operating said pin, said means comprising a rod operatively associated with said pin and means to operate said rod.

9. A forming machine having in combination, a forming and clamping structure, a straight forming and clamping channel in the surface thereof for receiving a heated metallic bar, means to deform said channel to form and clamp said bar, operating means for said deforming means, a cam engageable with said operating means for unclamping said bar, means associated with said channel to eject said bar from said slot and operating means for said ejecting means.

10. A machine for forming helical lawn mower blades, and the like, having in combination a plurality of elements, means supporting said elements for relative movement about a common axis, spaced shoulder portion defining slots in said elements, means for arranging the slots in said elements in alignment to receive a blade to be formed into helical shape, means for rotating said elements about said axis to place said slots in a helical path, said elements being closely disposed along said axis to bring said shoulder portions of adjacent elements into contiguous relationship, said shoulder portion of adjacent elements upon relative movement of said elements clamping substantially opposed portions of the blade, the clamping action of said shoulders of adjacent elements upon opposite sides of said blade limiting the relative movement of said elements.

11. A machine for forming helical lawn mower blades and the like, having in combination a plurality of closely disposed elements supported for relative movement about a common axis, portions of said elements when in alignment defining a substantially continuous recess paralleling said axis for receiving the blade to be formed, said portions including spaced clamping shoulders located upon opposite sides of the blade being formed, said shoulders of adjacent elements upon opposite sides of the blade being adapted to clamp substantially opposed portions of the blade along its length upon relative rotation of the elements, and means for effecting relative rotation of said elements whereby said recess defining portions of said elements define a helical path about said axis.

12. A machine for forming helical lawn mower blades and the like, having in combination a plurality of closely disposed elements supported for relative movement about a common axis, spaced shoulder portions defining a recess for the insertion of a blade to be formed with said elements in alignment, said shoulder portion of each element being adapted to engage with opposite sides of said blade and being inclined to said axis and located in substantially the helical path of the finished blade, said shoulder portion of adjacent elements upon opposite sides of the blade being adapted to clamp substantially opposed portions of the blade upon relative rotation of the elements, and means for effecting relative rotation of said elements whereby said portions of said elements define a helical path about said axis.

13. A machine for forming helical lawn mower blades and the like having in combination a plurality of closely disposed elements supported for relative movement about a common axis, means defined in elements collectively defining a recess into which a blade to be formed may be inserted, said means including radially disposed clamping and aligning surfaces, said surfaces of adjacent elements being contiguously positioned to clamp substantially opposed portions of said blade with said means collectively defining a helical path, and means for effecting relative movement between said elements.

14. A machine for forming helical lawn mower blades and the like, having in combination a plurality of relatively movable elements, means for supporting said elements for relative movement about a common axis, means defined in said elements in which a blade to be formed is positioned and held while said elements are relatively moved to helically form the blade, said means comprising shoulder portions upon which the blade to be formed is supported edgewise, shoulder portions upon adjacent elements for engaging opposite sides of said blade, said last shoulder portions upon adjacent elements being contiguously positioned and upon relative movement of said adjacent elements engaging substantially opposed portions of said blade to clamp the same between said shoulders, means for effecting relative movement between said elements to dispose said blade supporting shoulders in the helical path, the relative movement between adjacent elements being limited by the engagement upon opposite sides of the blade by said shoulder portions of adjacent elements.

15. A forming machine having in combination, a bodily movable structure comprising a shaft having a plurality of concentrically disposed disks thereon, a radial slot located in the periphery of each disk, said slots being normally in straight alignment and forming a channel for receiving a bar to be formed, means for displacing said disks with respect to each other to vary the alignment of said slots to provide a bar placed therein with a predetermined shape, and means to eject the bar placed therein from said slots, said means including a fixed cam and an axially movable rod operated by said cam, and a plunger actuated by said rod and projected thereby into said channel for radially moving said bar therefrom.

16. A forming machine having in combination, a plurality of independently movable members having a common axis and each having a radial slot, said slots collectively defining an axially extending substantially continuous channel for receiving a metal bar to be formed and means including the metal bar to be formed for successively rotating said members inwardly from one end of said bar relative to each other to form said bar.

17. A forming machine having in combination, a plurality of independently movable members having a common axis and each having a radial slot, said slots collectively defining an axially extending channel for receiving a metal bar to be formed, means including the metal bar to be formed for successively rotating said members relative to each other to form said bar, means to eject said bar after it has been formed, the said means being disposed within said members, and means for preventing premature delivery of the bar from said channel.

TRUMAN B. FUNK.
HOWARD D. CORWIN.